US011944071B2

(12) United States Patent
Kalra et al.

(10) Patent No.: US 11,944,071 B2
(45) Date of Patent: Apr. 2, 2024

(54) PORTABLE PROTECTIVE SHIELD DEVICE FOR PROTECTING PET ANIMALS AGAINST ATTACK

(71) Applicants: Binny Kalra, New Delhi (IN); Abhishek Magotra, Noida (IN)

(72) Inventors: Binny Kalra, New Delhi (IN); Abhishek Magotra, Noida (IN)

( * ) Notice: Subject to any disclaimer, the term of this patent is extended or adjusted under 35 U.S.C. 154(b) by 171 days.

(21) Appl. No.: 17/309,946

(22) PCT Filed: Jan. 5, 2020

(86) PCT No.: PCT/IN2020/050015
§ 371 (c)(1),
(2) Date: Jul. 2, 2021

(87) PCT Pub. No.: WO2020/141563
PCT Pub. Date: Jul. 9, 2020

(65) Prior Publication Data
US 2022/0071176 A1    Mar. 10, 2022

(30) Foreign Application Priority Data
Jan. 5, 2019    (IN) .............................. 201911000587

(51) Int. Cl.
*A01K 29/00*    (2006.01)
*F41H 5/06*    (2006.01)

(52) U.S. Cl.
CPC ................ *A01K 29/00* (2013.01); *F41H 5/06* (2013.01)

(58) Field of Classification Search
CPC ........ A45B 3/14; F41B 15/022; F41B 9/0087; A01K 29/00; A01K 81/04; A01K 15/02; F41H 5/08; F41H 5/06
USPC ..................................... 89/36.01, 918, 36.07
See application file for complete search history.

(56) References Cited

U.S. PATENT DOCUMENTS

| 5,477,431 | A | * | 12/1995 | Curameng, Jr. | ........ F41B 15/00 362/116 |
| 9,192,152 | B1 | * | 11/2015 | Sparks | ..................... A45B 3/00 |
| 9,345,296 | B1 | * | 5/2016 | Lanear | ..................... A45B 3/14 |
| 2014/0240890 | A1 | * | 8/2014 | Bradshaw | ............. A01M 29/16 361/232 |

OTHER PUBLICATIONS

International Search Report and Written Opinion in corresponding International Application No. PCT/IN2020/050015 dated May 20, 2020.

* cited by examiner

*Primary Examiner* — Jeffrey R Larsen
(74) *Attorney, Agent, or Firm* — Westman, Champlin & Koehler, P.A.

(57) ABSTRACT

Described herein is a portable protective shield device for providing an instant protection to a pet animal against a sudden attack by an aggressive animal without causing any harm to the attacking animal. The device includes a pet protective shield capable of being actuated from a ready position to a protective position, the pet protective shield comprising at least one shielding member that, upon actuation, expands to form a shield around the pet. The present subject matter focuses on protecting the pet/animal under attack rather than tackling the attacker.

11 Claims, 8 Drawing Sheets

PORTABLE PROTECTIVE SHIELD DEVICE FOR PROTECTING PET ANIMALS AGAINST ATTACK

CROSS-REFERENCE TO RELATED APPLICATION

This Application is a Section 371 National Stage Application of International Application No. PCT/IN2020/050015, filed Jan. 5, 2020 and published as WO 20201141563 A1 on Jul. 9, 2020, in English, and further claims priority to Indian Application Ser. No. 201911000587, filed Jan. 5, 2019, the contents of which are hereby incorporated by reference in their entirety.

TECHNICAL FIELD

The present subject matter generally relates to protection of an animal against an attack. In particular, the subject matter relates to a portable pet/animal protective shield for protecting a pet/animal in the event of a sudden or aggressive attack from another animal or human being.

BACKGROUND

Animals, especially, untrained pets and stray dogs, are unpredictable when it comes to their behaviour. It is not uncommon for untrained pets or stray animals, such as stray dogs, to attack humans and other dogs. The most vulnerable and at risk due to such aggressive behaviour are household pets, who do not have the exposure to such challenges. As a result, household pets do not have the reflexes or defenses needed to deal with sudden attacks from other dogs and are normally not in a position to protect themselves adequately when attacked. Small and mid-sized pets are especially vulnerable to sudden attack by strays or untrained dogs when they are out for a walk in new or unfamiliar surroundings or in places having a concentration of packs of stray dogs.

Even if accompanied by the owner/walker and suitably leashed, small and mid-sized pets are prone to lethal injuries when suddenly attacked by aggressive and unruly animals as the reaction time and presence of mind of the accompanying owner/walker may vary from person to person. The shock of the sudden attack also causes nervous reaction from the pet and even the owner/walker, and a quick solution to ward off the attack does riot occur instantly.

General suggestions by experts and owners who have witnessed or experienced stray dog attacks on defenseless pets have to do with scaring away the attacker or repelling the attack. Among the suggestions posted on the internet are to throw water on an attacking dog or use pepper splay to repel the attack. Also, when under attack, many pet owners/walkers are likely to react by hitting out at the attacker with a stick, stun gun, baton or any available object like a stone or otherwise trying to frighten the unruly attacker. Essentially, all these methods are directed at warding off an attack or targeting the attacking animal and do not leave much scope for simultaneous protection of the pet under attack.

The existing solutions to protect a pet often mean harming the attacker, which is equally undesirable and an avoidable consequence of a pet's defense. Moreover, the existing solutions may not be proportionate to different types of attacks by unruly animals. Thus, for example, use of a stun gun against an attacking dog may be disproportionate if the degree of attack is not vicious or dangerous.

None of the existing methods are a complete solution or entirely practical or guaranteed to have the desired effect because these may not deter all manner of strays or untrained dogs who are in attack mode. Further, the safety of the owner/walker can also be compromised in such a situation because while trying to defend their pet from the attack, the owner/walker can also be attacked and thus need to look out not only for the pet under their care but themselves too.

The conventional methods are also not convenient from the point of view of managing a pet on a leash and simultaneously handling an attacking dog. A delay of even a few seconds, especially when there is an attack from a pack of stray animals, may lead to grave injuries to the pet. In a crisis, any delay may result in severe, even fatal, injuries to the pet. This is true not only for small or mid sized pets but also pets of bigger sizes which can be attacked and severely injured in such attacks.

Therefore, there is a well felt need for a pet/animal protection device and method that overcomes the above and other related challenges of protecting a pet/animal against sudden attacks without having to harm the attacker.

SUMMARY

It is desired to prevent a sudden attack on pets/animals that exposes them to fatal injuries.

It is also desired to provide an instant protection for a pet/animal when attacked by an aggressive animal.

It is also desired to avoid causing harm to the attacking animal.

It is also desired to provide an instant protective shield around a pet/animal that is under attack.

Unlike the existing solutions, the focus of the present subject matter is to protect the pet/animal under attack rather than tackle and/or attack the attacker.

The subject matter describes herein relates to a portable protective shield device for protecting a pet animal against a sudden attack. In one aspect, the portable protective shield device includes a pet protective shield capable of being actuated from a ready position to a protective position, the pet protective shield comprising at least one shielding member that, upon actuation, expands to form a shield around the pet.

In an embodiment of the present subject matter, the pet protective shield is accommodated in a hollow baton or stick having a handle at one end and at least one opening at the other end.

In another embodiment of the present subject matter, the portable protective shield device further includes a central longitudinal member that extends longitudinally from the handle to the at least one opening of the hollow baton for supporting the pet protective shield.

In yet another embodiment of the present subject matter, one end of the at least one shielding member is attached to a sliding member, said sliding member being configured to slide along the length of the central longitudinal member, and other end of the at least one shielding member is freely located in the region of the at least one opening of the hollow baton.

In yet another embodiment of the present subject matter, the pet protective shield further comprises an actuating mechanism for actuating the at least one sliding member and the shielding member.

In yet another embodiment of the present subject matter, a locking mechanism is provided to lock the pet protective shield in ready position.

In yet another embodiment of the present subject matter, the locking mechanism is a mechanically or a solenoid-operated lock.

In yet another embodiment of the present subject matter, the portable protective shield device further comprises a triggering button in proximity to the handle or on the handle to trigger the sliding member.

In yet another embodiment of the present subject matter, the at least one shielding member comprises a plurality of longitudinal wire-like elements.

In yet another embodiment of the present subject matter, the at least one shielding member comprises at least one outward protruding portion for guiding the at least one shielding member out of the hollow baton.

In yet another embodiment of the present subject matter, the pet protective shield comprises one or combination of a cage, a web, a net or a mechanism of similar configuration.

In yet another embodiment of the present subject matter, the cage is in the form of a metallic mesh or a versatile natural or synthetic material or a combination thereof.

In yet another embodiment of the present subject matter, the pet protective shield is made up of one or combination of cloth, synthetic or any other versatile material.

In yet another embodiment of the present subject matter, the at least one opening of the hollow baton covered by an end cap or an end lock.

In yet another embodiment of the present subject matter, the end cap or end lock has provisions to block free ends of the central longitudinal member as well as Free ends of the at least one shielding member.

In yet another embodiment of the present subject matter, the end lock is tied at the distal end of the hollow baton by means of a holding mechanism, such as a wire, a thread, a tether or a similar mechanism.

In yet another embodiment of the present subject matter, the central longitudinal member has a telescopic configuration and comprises a plurality of shafts.

In yet another embodiment of the present subject matter, the at least one shaft of the central longitudinal member is provided with a stopper member In yet another embodiment of the present subject matter, the actuating mechanism comprises a coil spring that surrounds the central longitudinal member.

In yet another embodiment of the present subject matter, one end of the coil spring is attached to the handle and the other end of the coil spring rests on the sliding member or the stopper member, such that, in the ready position of the pet protective shield, the coil spring is in a compressed state and in the protective position of the pet protective shield, the coil spring is in an expanded state.

In yet another embodiment of the present subject matter, the portable protective shield device further comprises a limiting means at the distal end of the central longitudinal member or a thread-like member, such as a tether, attached to the handle at one end and to the sliding member or a stopper member at the other end, for limiting the movement of the sliding member or the stopper.

The present summary is provided only by way of example, and not limitation. Other aspects of the present invention will be appreciated in view of the entirety of the present disclosure, including the entire text, claims and accompanying Figures.

BRIEF DESCRIPTION OF ACCOMPANYING DRAWINGS

The present invention, both as to its organization and manner of operation, together with further objects and advantages, may best be understood by reference to the following description, taken in conjunction with the accompanying drawings. These and other details of the present invention will be described in conjunction with the accompanying drawings, which are furnished only by way of illustration and not in limitation of the invention, and in which drawings.

DETAILED DESCRIPTION

Figure 1:
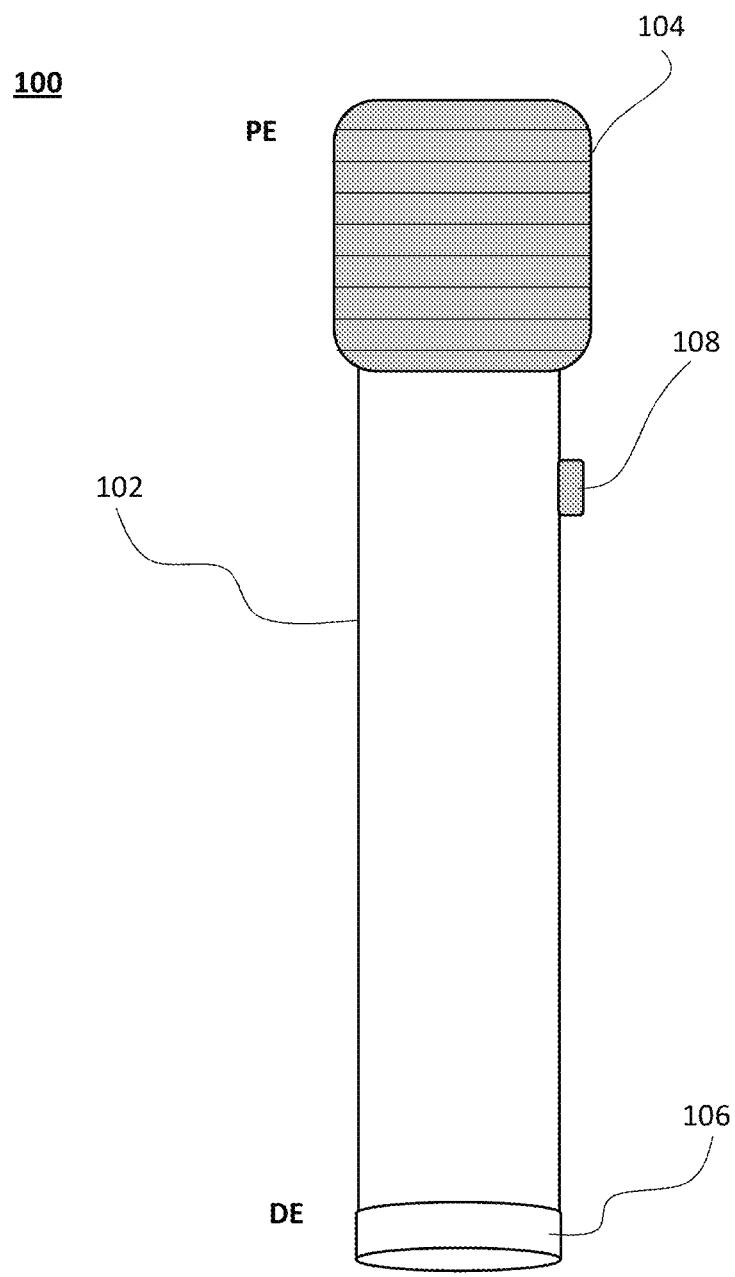
FIG. 1 illustrates a schematic representation of a portable protective shield device for protecting a pet animal in accordance with first embodiment of the present subject matter.

The following presents a detailed description of various embodiments of the present subject matter with reference to the accompanying drawings.

The embodiments of the present subject matter are described in detail with reference to the accompanying drawings. However, the present subject matter is not limited to these embodiments which are only provided to illustrate and explain more clearly the present subject matter to a person skilled in the art of the present disclosure. In the accompanying drawings, like reference numerals are used to indicate like components.

The specification may refer to "an", "one", "different" or "some" embodiment(s) in several locations. This does not necessarily imply that each such reference is to the same embodiment(s), or that the feature only applies to a single embodiment. Single features of different embodiments may also be combined to provide other embodiments.

As may be used herein, the singular forms "a", "an" and "the" are intended to include the plural forms as well, unless expressly stated otherwise. It will be further understood that the terms "includes", "comprises", "including" and/or "comprising" when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "attached" or "connected" or "coupled" or "mounted" to another element, it can be directly attached or connected or coupled to the other element or intervening, elements may be present. As used herein, the term "and/or" includes any and all combinations and arrangements of one or more of the associated listed items.

The figures depict a simplified structure only showing some elements and functional entities, all being logical units whose implementation may differ from what is shown.

FIG. 1 illustrates a schematic representation of a portable protective shield device 100 in accordance with first embodiment of the present subject matter. The device 100, when actuated by the user, provides an instant protective shield around a pet animal that is about to come under attack so that an immediate protection from sudden attack is provided to the pet. The shield can be in the form of a cage, web, net, etc. and made up of cloth, synthetic or any other versatile material. The cage can be in the form of a metallic mesh or a versatile natural or synthetic material. In an embodiment, a combination of metallic mesh and cloth material or any other suitable material can be employed to form the shield. In particular, the protective shield has the characteristics that prevents room for an attacker animal to bite, wound or scratch the pet.

For the purpose of present description, the expression 'proximal end' is used to denote the end that is nearer to the user and the expression 'distal end' is used to denote the end that is away from the user. Further, the expression 'ready position' is used to denote that the component or components are in locked state, i.e. when the portable protective shield device 100 is not triggered and the expression 'protective position' is used to denote that the component or components are triggered to form an instant protective shield around a pet animal.

The portable protective shield device 100 includes a hollow baton or stick 102 that houses an expandable pet protective shield (not shown in FIG. 1) in ready position. The hollow baton 102 includes a handle 104 at its proximal end PE and at least one opening (not shown in FIG. 1) at its distal end DE.

The pet protective shield inside the hollow baton 102 is capable of expanding instantly upon actuation by the user. Once actuated, the pet protective shield immediately exits the opening at the distal end DE of the hollow baton 102 and expands to surround the pet animal, as will be explained later, thereby providing an instant protection to the pet from a sudden attack. The opening at the distal end of the hollow baton is covered by an end cap 106 as shown in FIG. 1. The end cap 106 prevents inadvertent release of the pet protective shield from the hollow baton 102 when the portable protective shield device 100 is not actuated.

The portable protective shield device 100 according to the present embodiment further includes a trigger button 108 for triggering the pet protective shield to shift from its ready position to protective position. In the present embodiment, the triggering button 108 is provided proximal to the handle 104 on the hollow baton 102 for its ease of access by the user in a panic situation. When there is a sudden attack by an animal, such as a stray dog, the trigger button 108 can be accessed and triggered immediately by the user with the same hand with which the portable protective shield device 100 is held.

Figure 2:
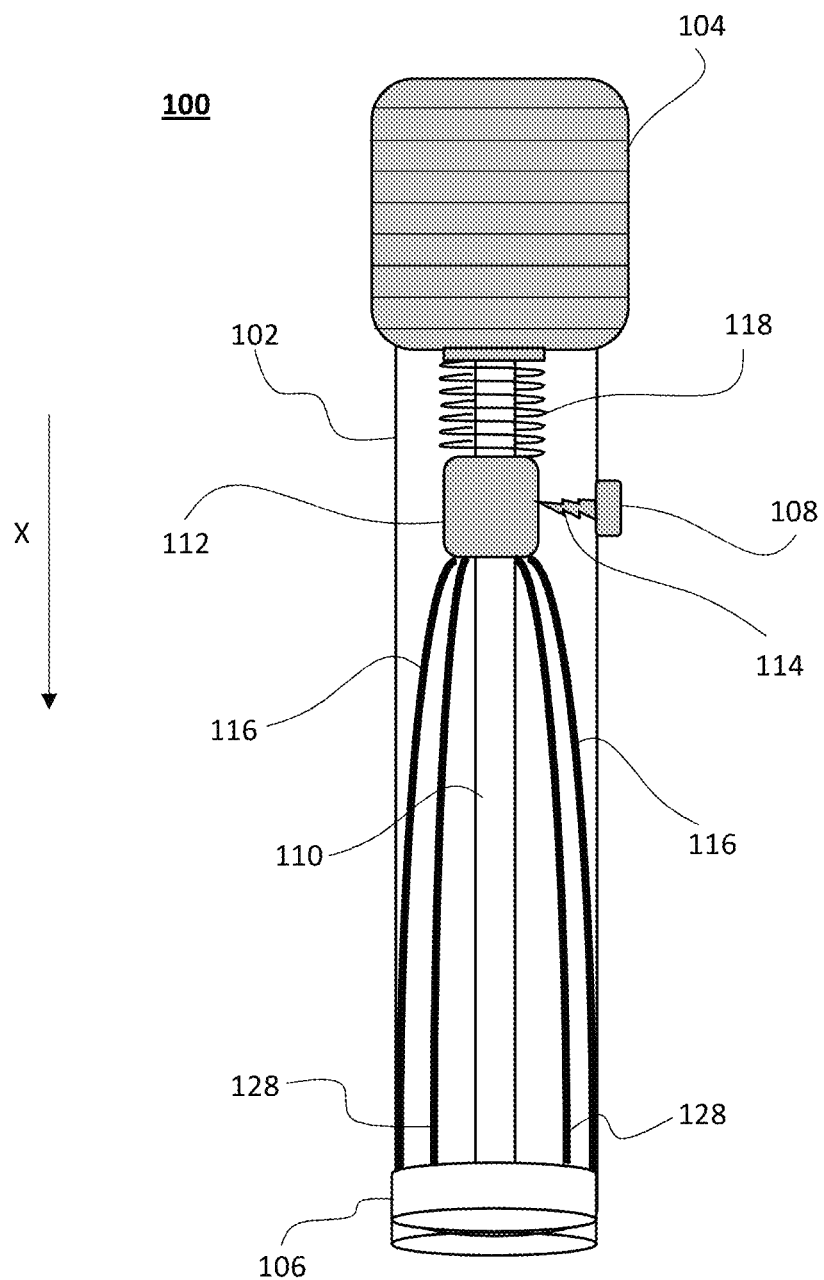
FIG. 2 illustrates a sectional of the portable protective shield device with an end cap depicting its components in ready position in accordance with first embodiment of the present subject matter.
Figure 3:
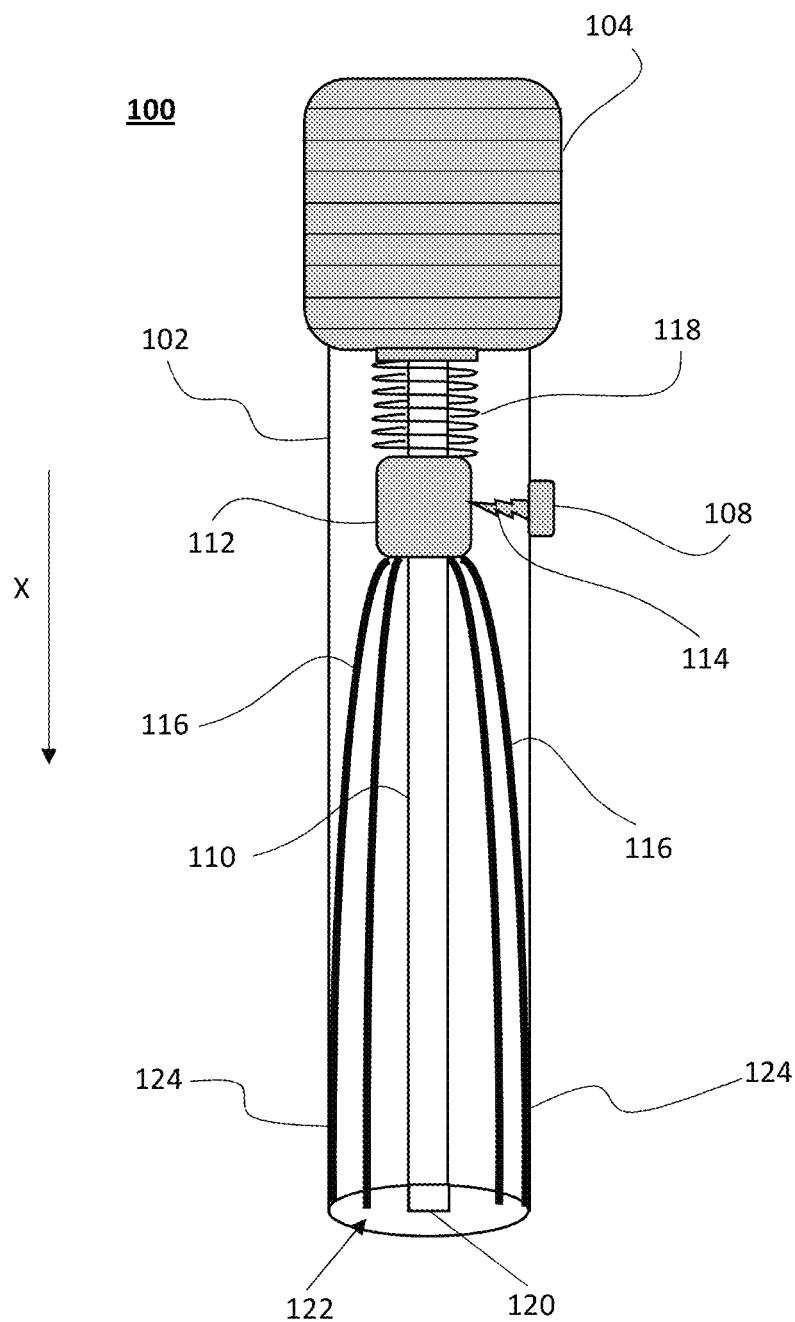
FIG. 3 illustrates a sectional view of the portable protective shield device without an end cap in accordance with first embodiment of the present subject matter.

FIG. 2 illustrates a sectional view of the portable protective shield device 100 depicting its components in ready position in accordance with first embodiment of the present subject matter. FIG. 3 illustrates a sectional view of the portable protective shield device 100 without the end cap 106 depicting in accordance with first embodiment of the present subject matter. The internal components of the portable protective shield device 100 include, but are not limited to, a central longitudinal member 110 and the pet protective shield. The pet protective shield includes a plurality of components. For example, and by no way limiting the scope of the present subject matter, the pet protective shield includes a sliding member or slider 112 that is slidably mounted on the central longitudinal member 110 and held in position by a locking mechanism 114, at least one shielding member 116 that forms a protective shield around the pet animal when the pet protective shield shifts from its ready position to the protective position, and an actuating mechanism 118 for actuating the at least one shielding member 116 to move from its folded state to the expanded state.

For the purpose of the present subject matter, folded state of the at least one shielding member 116 is the state in which the at least one shielding member 116 is held within the hollow baton 102, and the expanded state of the at least one shielding member 116 is the state in which the at least one shielding member 116 exits the hollow baton 102 and expands to form a shield or guard around the pet animal.

The central longitudinal member 110 according to the present subject matter is a fixed member located inside the hollow baton 102 in relation to which other movable components of the portable protective shield device 100 are configured to move. In a preferred embodiment of the present subject matter, the central longitudinal member 110 has a rod-like configuration that is positioned concentric to and runs parallel to the hollow baton 102. The central longitudinal member 110 according to the present subject matter has sufficient strength to hold and support various components of the pet protective shield, and also to allow movement of the movable components mounted on it during multiple operations.

The longitudinal member 110 according to the present subject matter is a single longitudinal component. However, in a different embodiment, the longitudinal member 110 may have a telescopic configuration wherein at least one section of the longitudinal member 110 is stationary and at least one section is capable of being moved in longitudinal direction in relation to the stationary section.

In an embodiment of the present subject matter, the longitudinal member 110 is attached at its proximal end to the handle 104 of the hollow baton 102 and the distal end 120 of the longitudinal member 110 is free, as shown in FIG. 3. In a preferred embodiment, the end cap 106 has a central blind hole or pocket on its inner surface to hold the free distal end 120 of the longitudinal member 110 when the portable protective shield device 100 is in the ready position, i.e. when the end cap 106 is installed at the distal end DE of the hollow baton 102. This ensures that the free distal end 120 of the longitudinal member 110 is not misaligned when the portable protective shield device 100 is in ready position and the movable components of the pet protective shield are not obstructed when the portable protective shield device 100 shifts from ready position to protective position.

In an alternate embodiment, a ring-shaped locating element in the form of a spacer may installed inside the hollow baton 102 towards the distal end 120 of the longitudinal member 110 to hold the distal end 120 in an aligned configuration. In another embodiment, one or more locating members may be provided at a location other than the free end 120 of the longitudinal member 110. In yet another embodiment, the strength of the longitudinal member 110 may be further enhanced so that the free end 120 of the longitudinal member 110 is stationary, and concentric to the hollow baton 102, irrespective of the position portable protective shield device 100.

The sliding member 112 is slidably mounted on the central longitudinal member 110 and capable of moving along the central longitudinal member 110 in upward and downward directions. In an embodiment, the sliding member 112 is configured to slide along the length of the central longitudinal member 110. In another embodiment, the sliding member 112 is configured to have sliding as well as rotational motion along the length of the central longitudinal member 110. The sliding member 112 is triggered by the trigger button 108 in the embodiment described herein. The trigger button 108 according to the present subject matter may include, but not limited to, a push button, lever, slider etc.

Figure 4:
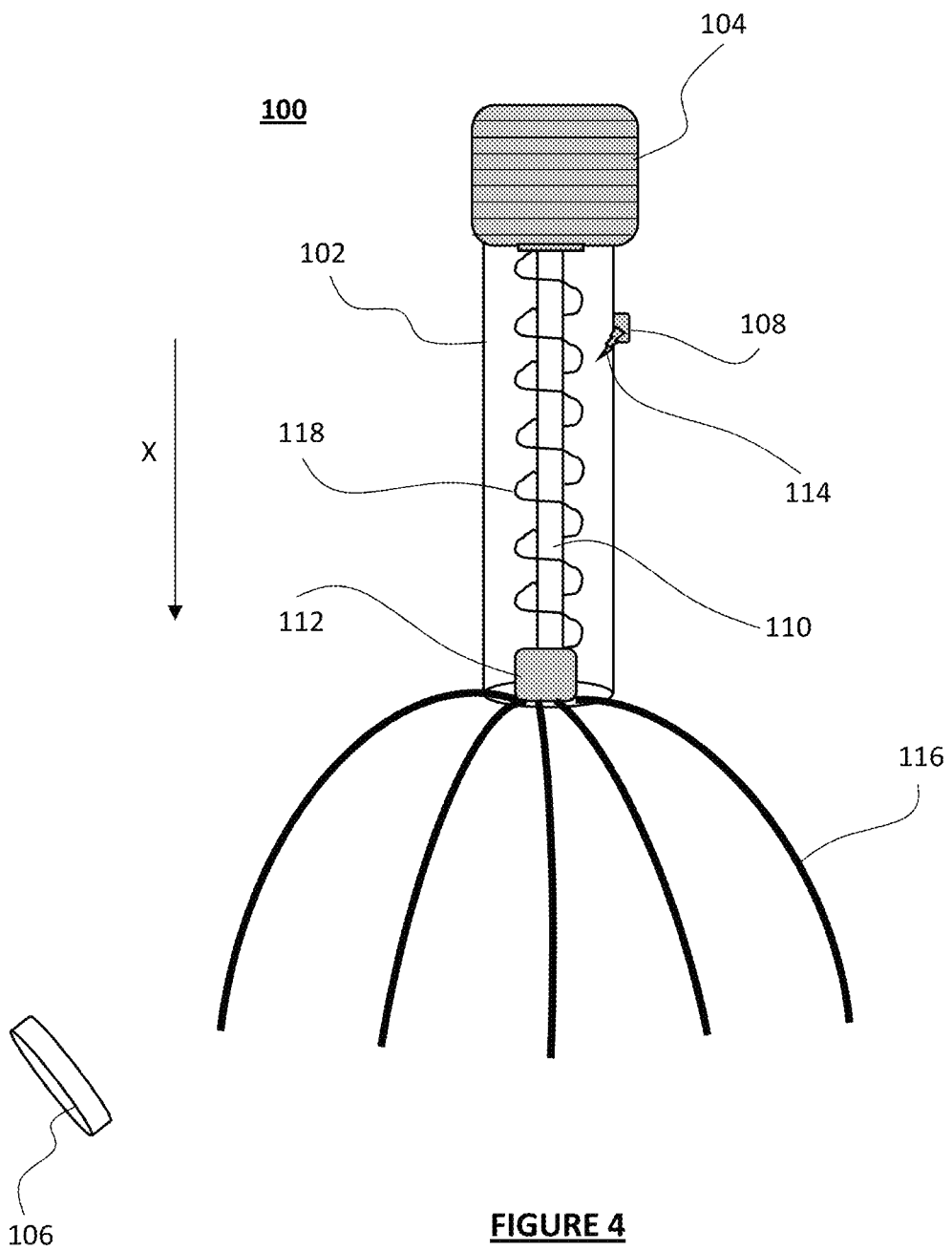
FIG. 4 illustrates a sectional view of a portable protective shield device depicting its elements in protective position in accordance with first embodiment of the present subject matter.

In the ready position of the portable protective shield device 100, the sliding member 112 is retained in its resting position by the locking mechanism 114, as is depicted in FIGS. 2 and 3. Once the trigger button 108 is pressed, the sliding member 112 gets unlocked and is actuated by the actuating mechanism 118. The actuating mechanism 118 according to the present subject matter includes, but not limited to, a coil spring, as shown in FIGS. 2 to 4. One end of the coil spring 118 is attached to the handle 104 and the other end rests on the sliding member 112, thereby biasing the sliding member 112 in its locked state. As shown in FIGS. 2 and 3, the coil spring 118 is in the compressed state and applies an axial biasing force on the sliding member 112 in the axial direction X.

Once the trigger button 108 is pressed by the user, the locking mechanism 114 releases the sliding member 112 in the baton or stick 102. The biasing force of the coil spring 118 gives an initial push to the sliding member 112 in the axial direction X and the sliding member 112 moves along the length of the central longitudinal member 110 towards the distal end 122 of the central longitudinal member 110. This initial push by the actuating mechanism 118 is sufficient to guide the at least one shielding member 116 in the axial direction X.

In an embodiment of the present subject matter, the at least ogle shielding member 116 includes, but not limited to, a plurality of longitudinal wire-like elements, as shown in FIGS. 2 to 4. In the present embodiment, one end of each longitudinal wire-like element 116 is attached to the sliding member 112 and the other end is a free end that loosely extends to the distal end DE of the hollow baton 102. In a preferred embodiment, provisions are made in the end cap 120 to accommodate and support free ends of one or more longitudinal wire-like elements 116 when the portable protective shield device 100 is in ready position. In a preferred embodiment, the longitudinal wire-like elements 116 are curved and include outward protruding portions 124, such that the longitudinal wire-like elements 116 are biased against the inner surface of the hollow baton 102 and the outward protruding portions 124 exert a radial force on the inner surface of the hollow baton 102 in a direction perpendicular to the axial direction X, as shown in FIGS. 2 and 3. The longitudinal wire-like elements 116 also exert an axial force on the end cap 120 in the ready position of the portable protective shield device 100.

After receiving the initial push by the actuating mechanism 118, the sliding member 112 as well as longitudinal wire-like elements 116 start moving in the axial direction X in the hollow baton 102. The force exerted by the actuating mechanism 118 is sufficient to displace the sliding member 112 towards the distal end DE of the hollow baton against frictional force acting between the sliding member 112 and the central longitudinal member 110 as well as frictional force acting between the curved longitudinal wire-like elements 116 and the inner surface of the hollow baton 102.

The initial push of the actuating mechanism 118 first allows the end cap 120 to dislodge from its position. The end cap 120 is attached at the distal end DE of the hollow baton 102 by a suitable mechanism such that when the longitudinal wire-like elements 116 are guided downwards due to actuating force of the actuating mechanism 118 beyond a prescribed limit, the end cap 120 is released from the distal end DE of the hollow baton 102 and free ends of the longitudinal wire-like elements 116 protrude out of the opening 122. In the present embodiment, the opening 122 is shown in FIG. 3. However, the distal end of the hollow baton 102 may be covered by an integral sheet-like member with a plurality of openings for movement of longitudinal wire-like elements 116 through them.

In an embodiment, the actuating mechanism 110 only provides an initial push to the sliding member 112 and hence, to longitudinal wire like elements 116. Since the longitudinal wire-like elements 116 continuously apply radial force on the inner surface of the hollow baton 102, this inherent radial force enables longitudinal wire-like elements 116 to expand in the direction perpendicular to axial direction X as soon as outward protruding portions 124 of the longitudinal wire-like elements 116 move distally of the opening 122 until the longitudinal wire-like elements 116 attain their expanded position and a shield around the pet animal is formed.

The protective position of the portable protective shield device 100 can be seen in FIG. 4, which illustrates a sectional view of the portable protective shield device 100 in accordance with first embodiment of the present subject matter. As can be seen in FIG. 4, in protective position of the portable protective shield device 100, the coil spring 118 is in expanded condition, the sliding member 112 is at the distal end DE of the hollow baton 102, and the wire-like elements 116 are completely expanded to form a protective shield.

In the embodiment described above, the movement of the pet protective shield is described by a combination of two forces, i.e. initial force in axial direction X by the coil spring 118 till outward protruding portions 124 approach the opening 122 and radial force by the longitudinal wire-like elements 116 once the outward protruding portions 124 reach the opening 122. However, in another preferred embodiment, the coil spring keeps applying force on the sliding member 112 till the protective shield is formed by the longitudinal wire-like elements 116. This force is in addition to the radial force of the outward protruding portions 124.

Figure 5:
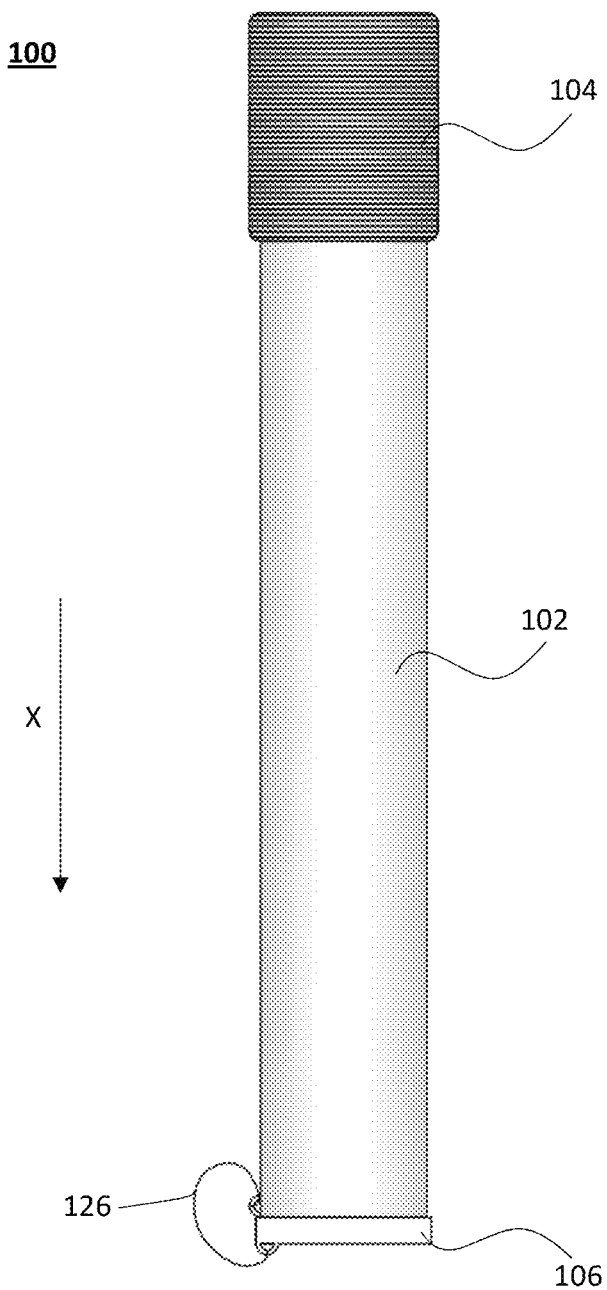
FIG. 5 illustrates a schematic representation of a portable protective shield device for protecting a pet animal in accordance with a second embodiment of the present subject matter.
Figure 6:
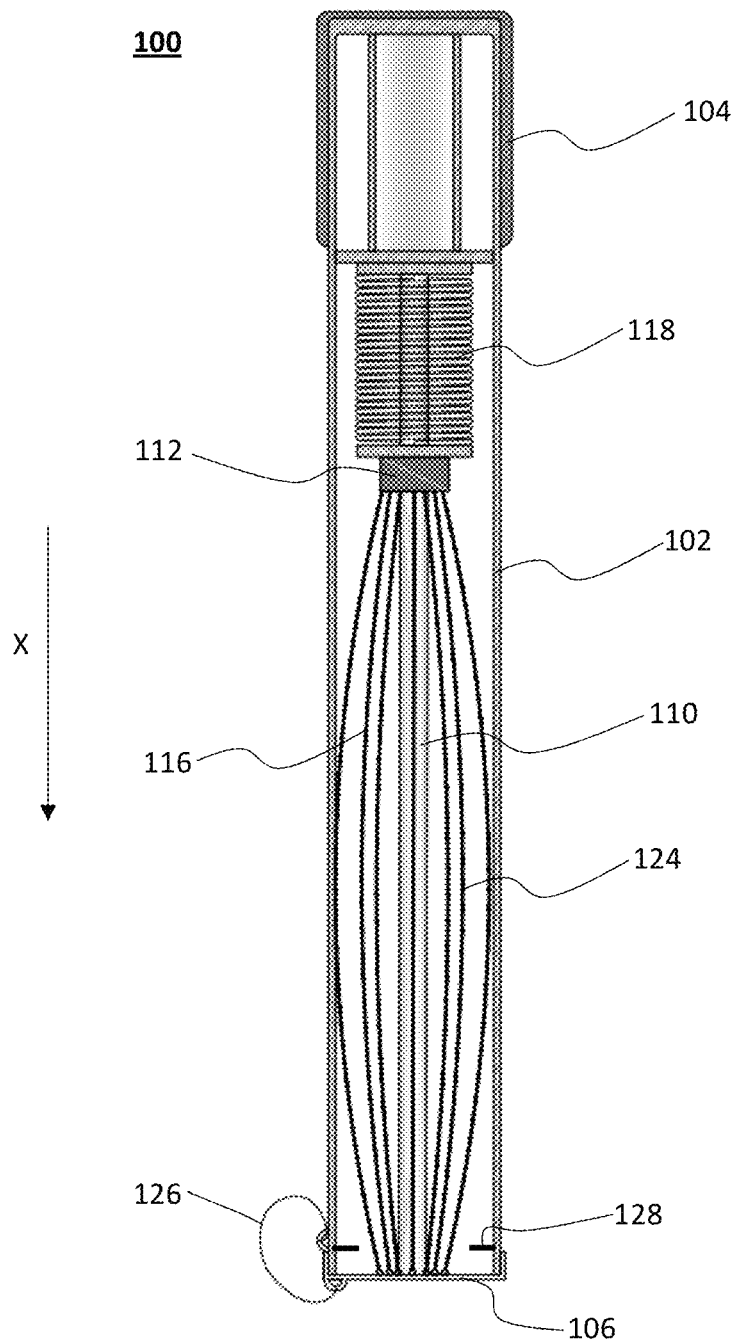
FIG. 6 illustrates a sectional view of a portable protective shield device depicting its components in ready position in accordance with the second embodiment of the present subject matter.
Figure 7:
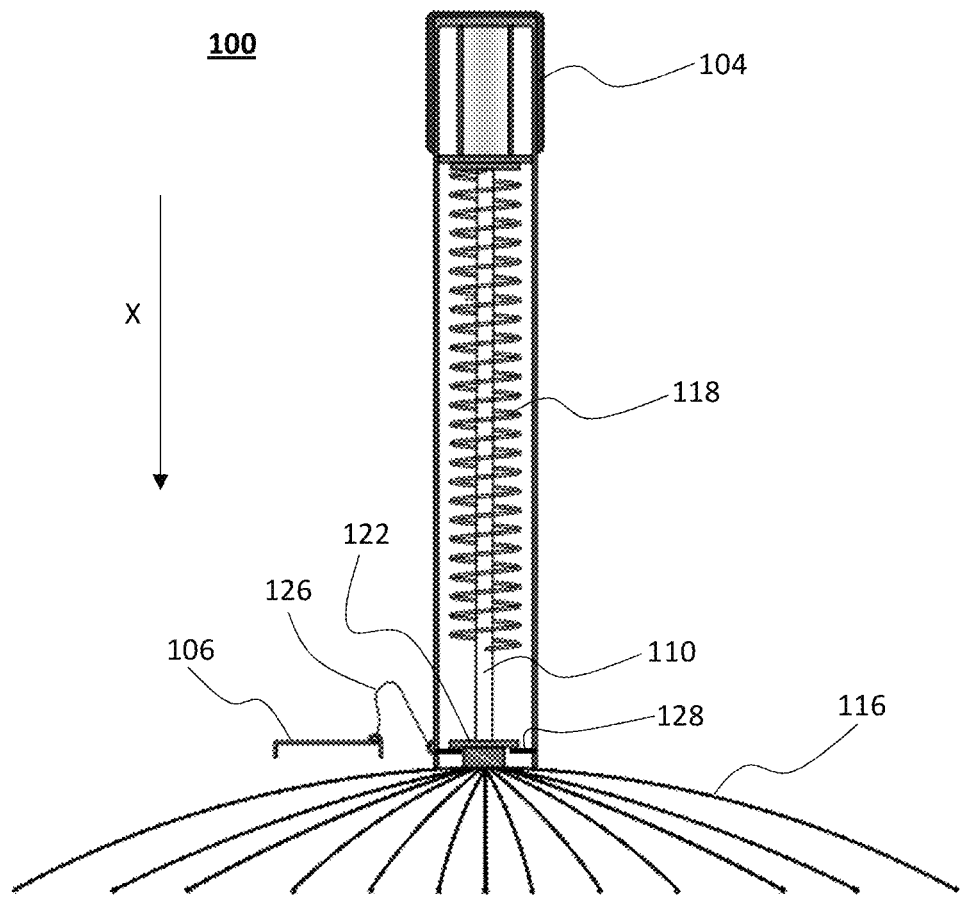
FIG. 7 illustrates a sectional view of a portable protective shield device in the protective position in accordance with the second embodiment of the present subject matter.

FIG. 5 illustrates a schematic representation of a portable protective shield device 100 for protecting a pet animal in accordance with a second embodiment of the present subject matter. FIG. 6 illustrates a sectional view of a portable protective shield device 100 depicting its components in ready position in accordance with the second embodiment of the present subject matter. FIG. 7 illustrates a sectional view of a portable protective shield device 100 in the protective position in accordance with the second embodiment of the present subject matter.

The portable protective shield device 100 of this embodiment is similar to the one described in the first embodiment in that the device 100 in both the embodiments includes a hollow baton 102 and a handle 104. However, the triggering button as well as the locking mechanism in the present embodiment are provided in the handle 104 instead of the hollow baton 102. In an embodiment, the mechanically operated locking mechanism of the first embodiment can be replaced with a solenoid-based locking mechanism. Similarly, any other mechanism can be employed in the present embodiment that enables triggering of the actuating mechanism 118, such as a coil spring, in the axial direction X.

In the embodiment described in FIGS. 5, 6 and 7, the actuating mechanism 118 also includes a coil spring that is concentrically located around the central longitudinal member 110. One end of the coil spring 118 is attached to the handle 104 whereas the second end of the coil spring 118 is not attached to the sliding member 112 in this embodiment. On the contrary, the second end of the coil spring 118 merely rests on the sliding member 112. The at least one shielding member 116 in the present embodiment also includes, but not limited to a plurality of longitudinal wire-like elements. Further, the end cap of the first embodiment is replaced with an end lock 106 in the present embodiment. It would be clear to a person skilled in the art that the end lock 106 may comprise a configuration that prevents inadvertent removal of the at least one shielding member 116 through the opening 122 of hollow baton 102. Further, the end lock 106 may include one or more provisions to support and align the central longitudinal member 110 as well as free ends of the longitudinal wire-like elements 116 in the ready position of the portable protective shield device 100.

As can be seen in FIGS. 5 and 6, the end lock 106 of the present embodiment is tied to the distal end DE of the hollow baton 102 by means of a holding mechanism 126. The holding mechanism 126 may include, but not limited to, a thread, a wire, a tether or any similar mechanism that holds the end lock 106 when the portable protective shield device 100 is triggered from the ready position as shown in FIG. 6 to the protective position as shown in FIG. 7.

Once the actuating mechanism 118 is actuated from its rest position as shown in FIG. 6 to the actuated position as shown in FIG. 7, the sliding member 112 is pushed in the axial direction X towards the distal end DE of the hollow baton 102. In the present embodiment, the rest position of the actuating mechanism 118 is the compressed state of the coil spring and the actuated position of the actuating mechanism 118 is the expanded state of the coil spring. The force exerted by the actuating mechanism 118 is sufficient to displace the sliding member 112 towards the distal end DE against the frictional force between the sliding member 112 and the central longitudinal member 110 and also against the frictional force between the at least one shielding member 116, in particular the outward protruding portions 124 of longitudinal wire-like elements 116, and the inner surface of the hollow baton 102. In an embodiment, the actuating mechanism 118 enables movement of the at least one shielding member 116 from its ready position as depicted in FIG. 6 to the protective or expanded position as depicted in FIG. 7. In the protective position, the at least one shielding member 116 expands outward to form a cage or shield around the pet animal. In another embodiment, the actuating member 118 only provides an initial push to the sliding member 112 and hence, the longitudinal wire-like elements 116. Since the longitudinal wire-like elements 116 are biased outwardly against the inner surface of the hollow baton 102, the longitudinal wire-like elements 116 expand as soon as the outward protruding portions 124 of longitudinal wire-like elements 116 move out of the opening 122.

The displacement of the sliding member 112 beyond the distal end DE of the hollow baton 102 is limited by a limiting means 128, as shown in FIG. 7. In an embodiment, the limiting means 128 include one or more protruding stoppers provided on the inner surface of the hollow baton 102 at the distal end DE such that the one or more protruding stoppers do not align with longitudinal wire-like elements 116 and do not hinder downward and upward movement of longitudinal wire-like elements 116 in the hollow baton 102. In another embodiment, the limiting means 128 include at least one thread-like member, such as a tether, attached to the handle 102 at one end and to the sliding member 122 at the other end.

Figure 8:
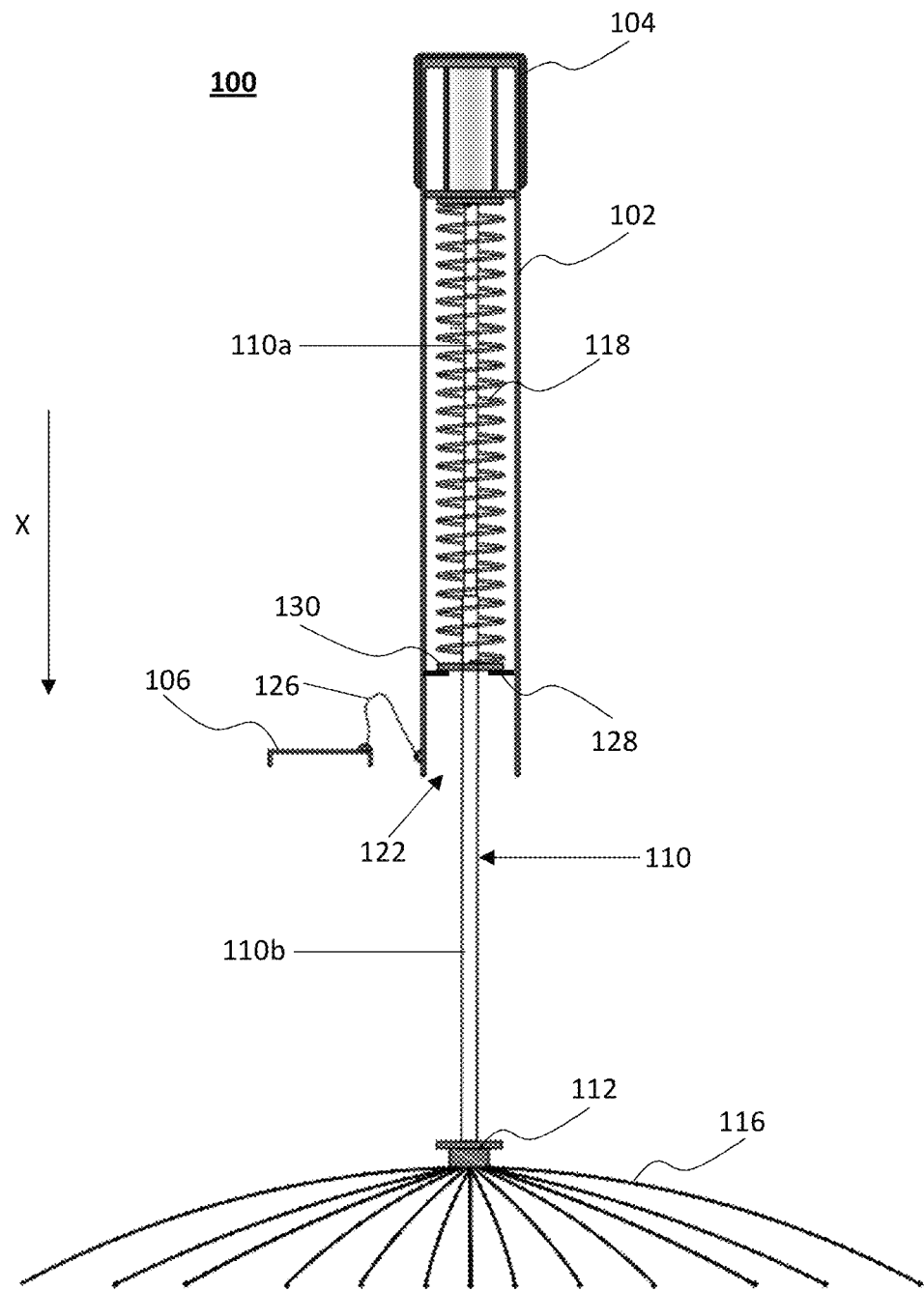
FIG. 8 illustrates a sectional view of the portable protective shield device depicting its elements protective position in accordance with a third embodiment of the present subject matter.

FIG. 8 illustrates a sectional view of the portable protective shield device 100 depicting its elements in protective position in accordance with a third embodiment of the present subject matter. In the present embodiment, the central longitudinal member 110 has a telescopic configuration and comprises a plurality of shafts 110a, 110b. The central longitudinal member 110 according to the embodiment depicted in FIG. 8 includes two shafts 110a and 110b. However, it would be clear to a person skilled in the art that more than two shafts may be provided in the portable protective shield device 100. In the present embodiment, one or more shafts are hollow and fully or partially accommodate other shaft or shafts. In the ready position, the first shaft 110a is fully inserted inside the second shaft 110b. The second shaft 110b is provided with a stopper member 130 on which the actuating member 118 rests as shown in FIG. 8. While one end of the actuating member 118 is fixed to the handle 104 in a similar manner as in the previous embodiments, the other end of the actuating member 118 may or may not be fixed to the stopper member 130. The sliding member 112 is mounted at the lower end of the second shaft 110b.

Upon actuation, the actuating member 118 expands and moves the second shaft 110b distally in the axial direction X by applying an axial force on the stopper member 130. This enables the longitudinal wire-like elements 116 to exit the opening 122 of the hollow baton 102, thereby enabling the portable protective shield device 100 to attain its protective position. In this embodiment, the distance between the stopper member 130 and the sliding member 112 can be varied as per the desired length of the central longitudinal member 110 in the protective position. Moreover, the length of first and second shafts 110a, 110b may be same or varied in relation to each other in different embodiments.

The displacement of the stopper member 130 beyond the distal end DE of the central longitudinal member 110 is limited by the limiting means 128, as shown in FIG. 8. The limiting means 132 may be in the form of a stopper provided at the distal end DE of the central longitudinal member 110 or a thread-like member, such as a tether, attached to the handle 102 at one end and to the sliding member 122 or the stopper member 130 at the other end, as described above.

In the embodiments described above, the axial force in the device is provided by a coil spring. However, as would be clear to a person skilled in the art, any other actuating mechanism such as a hydraulic/pneumatic actuator or any other similar mechanism may be employed to provide the initial push or complete displacement of the sliding member 112 or the stopper member 130. Further, a combination of same or different actuating mechanisms may be provided in the device 100.

In an embodiment, the entire force to displace the sliding member or the stopper member 130 to the distal end DE of the hollow baton 102 and hence, to displace the at least one shielding member 116 may be provided by one or more actuating mechanisms.

The at least one shielding member 116 described in the above embodiment includes curved longitudinal wire-like elements. However, the at least one shielding member 116 may be in the form of a mesh surrounded by a film or cloth of synthetic or any other suitable material in different embodiments. In other embodiments, the at least one shielding member 116 may include a synthetic or similar suitable material.

Once the device 100 attains the protective position, the whole pet protecting shield can be reinserted easily in the baton 102 merely by manually pushing the at least one shielding member 116 inside the hollow baton 102 against the force of the actuating mechanism 118. The retraction or inward movement is enabled by sliding of the sliding member 112 over the central longitudinal member 110 towards the proximal end PE of the hollow baton 102. Once the sliding member 112 reaches its original position, it automatically gets locked by the locking mechanism automatically. Thereafter, the end cap or end lock 104 can be placed and locked at the distal end DE of the hollow baton 102 to cover the opening 122.

In the embodiments described above, the actuating mechanism 118 is provided inside the hollow baton 102. However, in an embodiment, the actuating mechanism 118 may be provided partially or fully outside the hollow baton 102. For example, and by no way limiting the scope of the present subject matter, the actuating mechanism 118 is provided between the handle 104 and the hollow baton 102 in an embodiment. In another embodiment, the actuating mechanism 118 may be provided at the rear end of the handle.

The subject matter is explained in the context of protecting a pet animal from the attack of aggressive animals. However, it would be clear to a person skilled in the art that the present portable protective shield device 100 may be used as a shield to protect human beings, such as infants or small children from a sudden attack by an animal or other human being.

While the preferred embodiments of the present invention have been described hereinabove, it should be understood that various changes, adaptations, and modifications may be made therein without departing from the spirit of the invention and the scope of the appended claims. It will be obvious to a person skilled in the art that the present invention may be embodied in other specific forms without departing from its spirit or essential characteristics. The described embodiments are to be considered in all respects only as illustrative and not restrictive.

The invention claimed is:

1. A portable protective shield device for protecting a pet animal against a sudden attack, the portable protective shield device comprising:
   a pet protective shield capable of being actuated from a ready position to a protective position, the pet protective shield comprising at least one shielding member that, upon actuation, expands to form a shield around the pet:
   a hallow baton having a handle at one end and at least one opening at the other end, wherein said hollow baton houses the pet protective shield in ready state;
   a central longitudinal member mounted inside the hollow baton and extending longitudinally from the handle of the hollow baton to the ast one opening of the hollow baton for supporting the pet protective shield, wherein the at least one opening of the hollow baton is covered by an end cap;
   a sliding member mounted on the central longitudinal member and configured to slide along a length the central longitudinal member, wherein one end of the at least one shielding member is attached to said sliding member and other end of the at least one shielding member is freely located in a region of the at least one opening of the hollow baton in the ready position;
   an actuating mechanism that surrounds the central longitudinal member for actuating the at least one sliding member and the shielding member, wherein the at least one fielding member comprises a plurality of longitudinal wire-like elements, wherein the longitudinal wire-like elements are curved and include outward protruding portions, such that the longitudinal wire -like elements are biased against an inner surface of the hollow baton and the outward protruding portions exert a radial force on the inner surface of the hollow baton in a direction perpendicular to an axial direction, and wherein the longitudinal wire -like elements are configured to exert an axial force on the end cap in the ready position.

2. The portable protective shield device as claimed in claim 1, wherein a locking mechanism comprising a mechanically- or solenoid-operated lock, is provided to lock the pet protective shield in ready position.

3. The portable protective shield device as claimed in claim 1 further comprises a triggering button in proximity to the handle or on the handle to trigger the sliding member.

4. The portable protective shield device as claimed in claim 1, wherein the at least one shielding member comprises at least one outward protruding portion for guiding the at least one shielding member out of the hollow baton.

5. The portable protective shield device as claimed in claim 1, wherein the pet protective shield comprises one or combination of a cage, a web, or a net, and wherein the cage is in the form of a metallic mesh or a versatile natural or synthetic material or a combination thereof.

6. The portable protective shield device as claimed in claim 1, wherein the pet protective shield is made up of one or combination of cloth, synthetic or any other versatile material.

7. The portable protective shield device as claimed in claim 1, wherein the end cap has provisions to block free ends of the central longitudinal member as well as free ends of the at least one shielding member.

8. The portable protective shield device as claimed in claim 1, wherein the end cap is tied at a distal end of the hollow baton by means of a holding mechanism, such as a wire, a thread, or a tether.

9. The portable protective shield device as claimed in claim 1, wherein the central longitudinal member has a telescopic configuration and comprises a plurality of shafts, and wherein the plurality of shafts of the central longitudinal member is provided with a stopper member.

10. The portable protective shield device as claimed in claim 1, wherein the actuating mechanism comprises a coil spring, wherein one end of the coil spring is attached to the handle and the other end of the coil spring rests on the sliding member, such that, in the ready position of the pet protective, the coil spring is in a compressed state and in the protective position of the pet protective shield, the coil spring is in an expanded state.

11. The portable protective shield device as claimed in claim 1 further comprises a limiting means at a distal end of the central longitudinal member or a thread-like member attached to the handle at one end and to the sliding member or a stopper member at the other end, for limiting movement of the sliding member or the stopper.

* * * * *